E. D. MEIER.
Balanced Valve.

No. 228,210.  Patented June 1, 1880.

ATTEST:
John W. Herthel.
Chas Herthel

INVENTOR:
Edward D. Meier
per
Herthel & Co

N. PETERS, PHOTO-LITHOGRAPHER, WASHINGTON, D. C.

UNITED STATES PATENT OFFICE.

EDWARD D. MEIER, OF ST. LOUIS, MISSOURI.

BALANCED VALVE.

SPECIFICATION forming part of Letters Patent No. 228,210, dated June 1, 1880.

Application filed June 13, 1879.

*To all whom it may concern:*

Be it known that I, EDWARD D. MEIER, of St. Louis, Missouri, have invented an Improved Balanced Valve, of which the following is a specification.

This invention relates to the class of balanced valves.

My improvements are intended and used to enable the operator to throw on or shut off at will the water under pressure derived from an accumulator or any hydraulic motor. By the use of my improvements the pressure under the valve can be readily counterbalanced or overbalanced, or, by the further application of leverage weight or power, adapt the action of the valve to suit the particular application desired.

As here presented, my invention is in the nature of a balanced hydraulic valve, and as such has been applied and used with the pressures of hydraulic presses and accumulators for compress purposes.

I will first fully describe the construction and operation of my improvements, also the advantages derived from their use, and hereinafter point out the novel features thereof in the claims.

Figure 1:
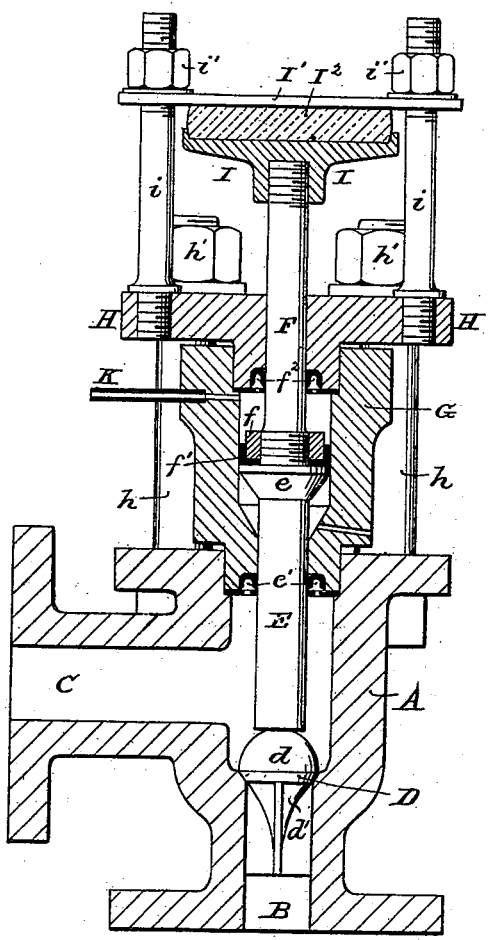
Figure 2:
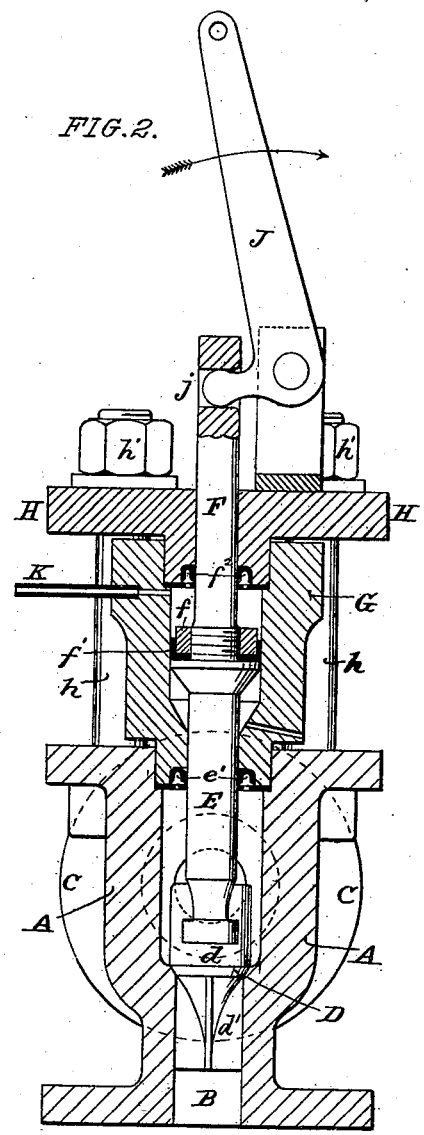
Figure 3:
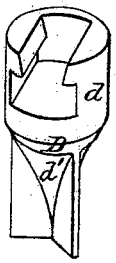

Of the drawings, Figure 1 is a sectional elevation, Fig. 2 being also a sectional elevation, showing the application of leverage weight as an auxiliary to retain the valve on its seat or lift it off the seat. Fig. 3 is a perspective of the valve.

A is the valve-chamber. B is the flange for connecting the valve-chamber to the pipe from the pumps, or engine, or accumulator, or other machine. C is the flange for connecting the valve-chamber to the pipe leading to the press or machine, to be supplied through the balanced valve.

D is the balanced valve. This valve can be any plain single-seat wing-valve having a bonnet or cap, $d$, in either of the forms shown in Figs. 1, 2, 3. In Figs. 2, 3 the bonnet $d$ has an opening only on one side, so that it can be slipped on the collar-shaped end of the valve-stem. In Fig. 1 the head of the valve is shown rounded off, with the end of the stem simply resting upon it. $d'$ are conically-rounded fillets formed between the wings of the valve to cause the liquid to act with less friction and to achieve a more easy distribution of the liquid around the valve.

E and F are both stems, forming in their entirety and action but one continuous stem. That part of the stem marked E has an enlargement or collar, $e$, working in the chamber G, and at $e'$ said stem part passes through proper water-tight packing. (See figures.) F, the upper or remaining part of the stem, also works in the chamber G, and has at $f$ a nut or collar made water-tight by proper packing, $f'$, and otherwise is fitted to engage the collar of the stem E; also, the stem F, at $f^2$, has proper packing where it passes through the cap. (See figures.)

I deem it important that the controlling plungers or stem E F be entirely separate from the valve D; in other words, said parts are loosely connected, as shown. On removing the cylinder G, with the stem E F, this valve D can be readily got at, properly ground, and fitted to its seat, so as to make a perfect joint. Specially, however, when the stem E F and cylinder G are replaced, the bearing of the lower stem, E, on valve D is such that any variation in the inclination of valve and stem axes is immaterial. In the same manner a variation in the seating of the valve by reason of any foreign matter, grit, &c., under the same will not affect the action of the stem, as the same is practically independent of the angle of inclination of the axis of the valve.

G, the chamber, can be cast to form one piece with the valve-chamber A, or it may form the separate piece shown.

H is a cap, lid, or flange to close the chamber G. The chamber G, closed by its cap, is jointed or secured to the valve-chamber by rods $h$ and nuts $h'$, or in any other well-known manner.

I is a platen or carrier secured to that part of the stem E F which is prolonged through the cap H. Between the carrier I and the top flange, cap, or plate, I', is interposed a spring or cushion, I², and all said parts, by rods and nuts $i$, are properly secured to the cap H, as shown. The action of the spring or cushion can be regulated or controlled by tightening or loosening the nuts $i$, and the purpose of said cushion is to check, limit, and otherwise control the upward pressure upon the valve and stem.

In place of the parts just described, that cushion the upward action of the valve and stem, the auxiliary device of a lever and weight can be used to permit the valve to move up or down or firmly retain same on its seat. Thus the stem F can have a slot or yoke at $j$, in which the bell-crank lever J engages, and as clearly shown in Fig. 2.

K is a small pipe carrying the liquid under pressure to the chamber G and above the collar and packing of the stem E.

The action of the valve is as follows: The water or other liquid, with the required pressure, stands under the valve D, and its total pressure under this valve is counterbalanced by the water or liquid under pressure, which is conveyed to the chamber G by the pipe K, the surface of the collar $e$ exposed to hydrostatic pressure being so proportioned as to give the desired excess of pressure on this collar over and above the total pressure under the valve D; or the total pressure on $e$ may be so much less than that under D that it may be necessary to apply any desired weight or power to the bell-crank J to insure the valve D being held down on its seat. To open the valve D the lever or bell-crank is moved in the direction indicated by the arrow, Fig. 2, thus raising the stem E F and removing the counterbalance-pressure from the valve D, which is lifted by the pressure under it. The lift of the valve may be exactly limited by the distance between the collar $e$ and the cap H, and may be regulated to any desired opening by actuating the bell-crank; or the requisite excess of pressure being caused by the means explained on the exposed upper surface of the collar $e$ in the chamber G, it may be removed at will by allowing a portion of the liquid to escape through the pipe K by means of a three-way cock or a pair of valves placed on this pipe at any convenient place, thus permitting the valve to rise to any desired lift by reason of the pressure under said valve, the spring or cushion being then brought into action to prevent shock in opening and facilitate closing the valve. The closing is accomplished and secured by again admitting more water or liquid under pressure to the chamber G.

A pair of such valves being used, working under different pressures, the higher and lower pressure can be alternately applied over the collar $e$ of either valve, thus insuring the closing of the one at the instant the other opens.

My improved valve is readily and very easily operated, is more economical in use, renders the machine or apparatus to which it is connected more manageable, and consequently safer, and is applicable to either high or low pressures.

What I claim is—

1. The separate stem with surface or enlargement, as at $e$, and resting on the valve D, the former exposed to liquid pressure in an opposite direction to a similar pressure under the valve, by means whereof the pressure on the stem is transmitted to said valve irrespective of the inclination of the axis of these two parts, as and for the purposes set forth.

2. The combination of the valve-chamber having branches B C G, the valve D, the stems E F, the former having the enlargement at $e$ and the latter at $f$, the cap H, and pipe K, all said parts being arranged to operate in the manner and for the purposes set forth.

3. The combination of the valve-chamber A, having valve D, the chamber G, the stems E F, (the former having collar $e$, the latter the nut $f$,) the cap H, the carrier I, cushion I$^2$, top plate, I$'$, through-rods $i$ and $h$, and the pipe K, all said parts being constructed to operate in the manner and for the purpose set forth.

4. The combination of the valve-chamber A, having valve D, the chamber G, the stems E F, collars and nut at $e f$, the cap H, pipe K, and bell-crank J, all said parts being constructed to operate in the manner and for the purpose set forth.

In testimony of said invention I have hereunto set my hand.

EDWARD D. MEIER.

Witnesses:
WILLIAM W. HERTHEL,
JOHN W. HERTHEL.